J. M. GROH.
Harvester.
No. 36,780.
Patented Oct. 28, 1862.
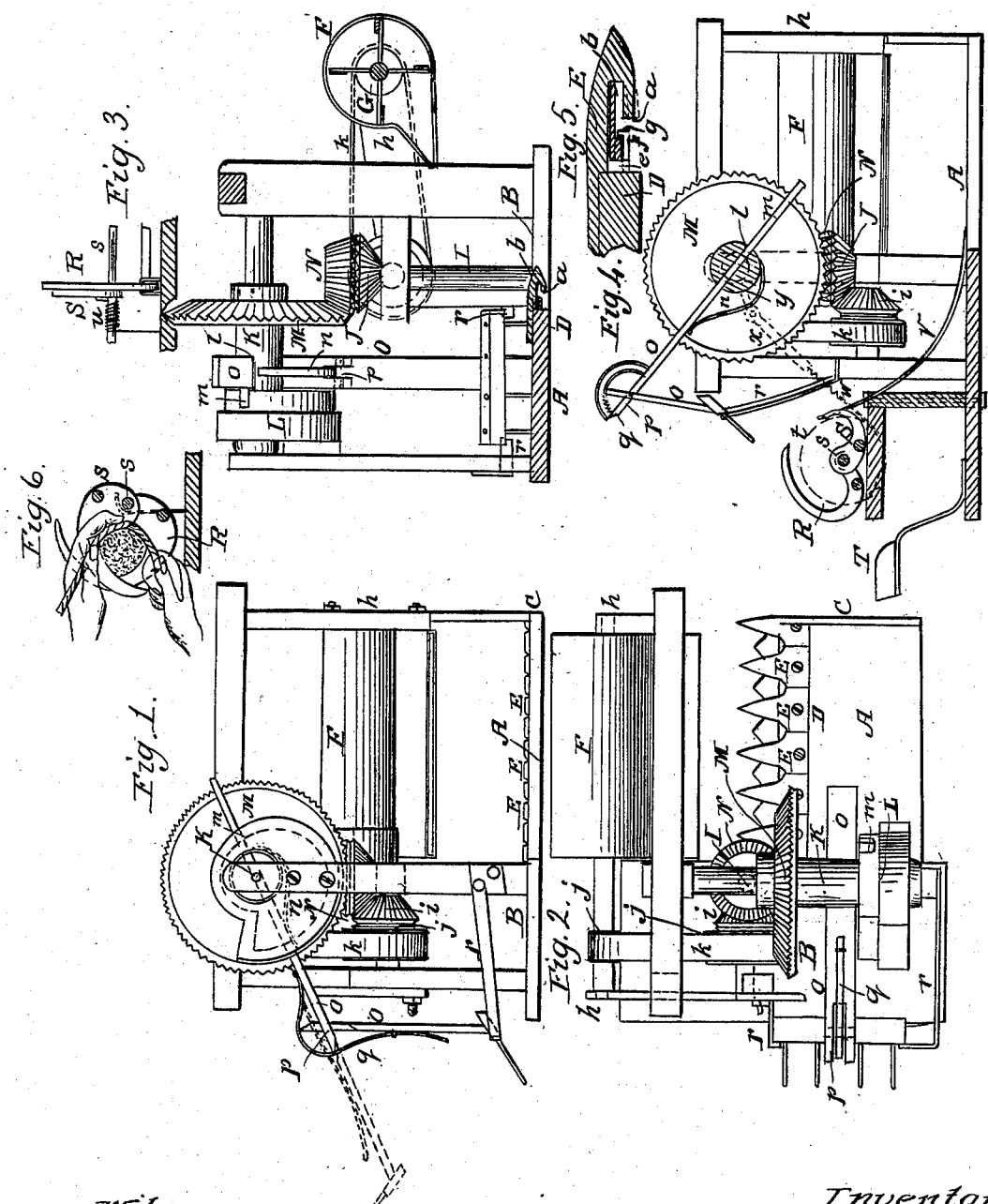

UNITED STATES PATENT OFFICE.

JOHN M. GROH, OF SHAEFFERSTOWN, PENNSYLVANIA.

IMPROVEMENT IN HARVESTERS.

Specification forming part of Letters Patent No. 36,780, dated October 28, 1862.

*To all whom it may concern:*

Be it known that I, JOHN M. GROH, of Shaefferstown, in the county of Lebanon and State of Pennsylvania, have invented a new and useful Improvement in Harvesting-Machines; and I do hereby declare that the following is a full, clear, and exact description of the same, reference being had to the accompanying drawings, forming part of this specification, in which—

Figure 1 is a rear end view of my improvements as used for cutting grain and raking the same automatically from the platform. Fig. 2 is a plan of the same; and Fig. 3, a longitudinal vertical section through the cutting apparatus and platform, looking toward the draft-frame side of the machine. Fig. 4 is a vertical transverse section of my improvements as used for cutting and raking and gaveling or bundling the grain before it leaves the platform. Figs. 5 and 6 are details of my invention.

Similar letters of reference in the several figures indicate corresponding parts.

My invention consists, first, in a jointed automatic rake handle or arm, in combination with a slotted shaft, cam, pintle, springs, and stationary discharge-adjusters, the same to be combined with the harvester and operated simultaneously with the cutting of the grain by gearing driven from the main drive-wheel.

My invention consists, secondly, in the construction of the compressing and bundling claws, so that ready access of the fingers between their shafts and the bundle of grain is secured, and thus the passage of binding straws, cords, or wires around the bundle rendered very convenient.

My invention consists, thirdly, in attaching one series of the claws to a revolving or turning disk and to a spring, and combining said disk with the shaft of the jointed rake-arm by the means and as hereinafter described.

To enable others skilled in the art to make and use my invention, I will describe the same more minutely with reference to the drawings.

A designates what is intended to be a platform, of suitable construction and size for supporting the working mechanism of the harvester. This platform, in practice, is to have a driving-wheel under or within its draft-frame portion B, and a side or grain wheel under its grain-side portion C; but in the drawings I have omitted the same, as my improvements relate to other parts of the harvester.

On the front edge of the platform, or the finger-beam portion D thereof, I arrange a series of guard-fingers, E, which are constructed with an under discharging-opening, *a*, instead of, as usual, with an upper opening. The upper portions of these fingers are closed, and on the upper portion of the knife-slot *b* a cutting-edge, *c*, is formed for the knives to cut against, both in their back and forward motion. In order to support and throw forward the knife-bar and knives, narrow offsets *e* are formed on the front edge of the finger-bar at intervals, and narrow hangers or supporting-brackets *f* are also extended forward of these shoulders or offsets, but below them, as represented in Fig. 5. The knife-bar is arranged upon the brackets, and the knives stand above the vertical portion *g*, while the back edges of the knife-bar and knives are placed to work against the narrow offsets *e*, instead of against the whole surface of the front edge of the finger-beam, forward motion of the knife-bar being prevented by the shoulders or vertical portions *g* of the brackets *f*. By this arrangement much friction between the cutter-bar and cutters and the finger-beam is obviated, and the great end aimed at in all cutting apparatuses accomplished in a far superior manner—viz., the clogging of the cutting apparatus with dirt, "tuft," or grass prevented. It is obvious that the under discharging guard-fingers present a more natural discharge for all accumulating substances than the opening in the upper part of such fingers, especially so when the lower part of the slot *b* is inclined, as indicated in red; and, besides this, the spaces in rear of the knife-bar afford a ready escape for trash and such substances that usually tend to clog the bar and its cutters.

Above the cutter-bar or cutting apparatus a fan-case, F, is arranged, so that the nozzle stands at an angle to the horizon. Within this case a revolving fan, G, of any suitable construction, is placed. The shaft of the fan is extended beyond the outside of the case, and has its support on the frame of the harvester, as at *h*. In practice the fan-case will have an adjustable nozzle, and the whole "blower" is to be adjustable in the path of a circle, so as to suit different heights and thicknesses of grain. The operation and position of the blower relatively to the cutter-bar and forward part of the harvester-frame is substantially the same as that of the ordinary reels, excepting that the blast instead of the arms of the reel is the agent employed to bend down and hold the grain to the cutters. The blast acts forcibly but very gently upon the heads and stalks of wheat, and does not beat out the kernels before the cutting is effected. I have represented a vertical shaft, I, with bevel-wheel J on its upper end, for transmitting motion from the driving-wheel (not shown) of the harvester to the fan-shaft gearing $i\,j\,k$, said gearing consisting of a bevel-wheel $i$, pulleys $j\,j$, and belt $k$. The form or character and arrangement of the gearing may be modified to suit the style of harvester to which the fan is applied.

For the purpose of raking the cut grain off the platform, either directly upon the ground or into compressing-claws, ready to be bound or tied I have arranged a revolving shaft, K, longitudinally over the center of the platform or machine. This shaft extends through a stationary cam, L, at one end, and has a bevel-wheel, M, on the other end. The bevel-wheel gears with a small bevel-wheel, N, arranged above the bevel-wheel J on the shaft I. Therefore the motion of the shaft K is also derived from the main drive-wheel of the harvester. This system of gearing also must be arranged and adapted to the different styles of harvester to which the improvement is applied. Vertically through the shaft K a slot, $l$, is cut, and in this slot a jointed rake-arm, O, is fitted to slide freely, being controlled in its sliding motion back and forth by means of a pintle, $m$, which rides around the cam L, and a spring, $n$, which attaches to the shaft K and to the upper portion of the arm O. The joint $p$ of the arm O is formed on an oblique line, and bends or "breaks" only in the direction of the grain-wheel side of the machine, as illustrated in Fig. 1. The joint breaks against a spring, $q$, and therefore when the head of the rake is freed of its gavel of grain the joint assumes, by the action of the spring, its original position.

In order to arrest the rake and adjust it at the discharge end of the platform, two angular bars, $r\,r$, are provided, as represented in Figs. 1, 2, and 3.

It will be evident that as the shaft K revolves the pintle of the rake-arm will be caused to go round with it, and in doing this the pintle will come in contact with the stationary cam L, and consequently the rake-arm will be caused to slide in the slot and reduce the distance between the rake-head and the shaft K. This sliding of the rake-arm causes the spring $n$ to bow and act with a tension upon the rake-arm, said tension tending to throw the rake-arm back to its original position. This sliding of the rake-arm is necessary in order to have the rake-head fall upon the platform properly, and not hang upon the guard-boards. As soon as the rake-head is ready to drop upon the platform the spring has full control over it, and instantly acts to throw it close against the guard-board, so as to effectually take hold of the cut grain and leave none behind. The rake-head now moves forward, and the resistance offered by the grain causes the rake-arm to form at its joint nearly a right angle. In this condition it sweeps the grain toward the side of the platform, a slight upward sliding movement taking place in the arm as the distance between the rake-head and the shaft decreases. At the completion of the movement the rake-head is arrested and caused to slide a short distance by the bars $r\,r$. This action gives the grain a jog and allows it time to escape before the spring $q$ suddenly causes the rake-arm to assume a straight condition, as shown in red in Fig. 1, which condition the moment it passes the bars or adjusters it does assume by reason of the tension on the spring $q$ being withdrawn. Thus the operation proceeds if it is not desired to compress and tie the grain before it leaves the platform.

In order to compress and tie the grain, I arrange at the discharging side of the platform a series of claws, R S, as shown in Fig. 4. A seat, T, for the binder-man, is also arranged at this point, just behind the claws. The claws R are stationary, but those S turn on an axis, $s$, which axis is supported in bearings of an extension of the platform, and has a grooved pulley or disk, $t$, on its rear end, and a spiral spring, $u$, wound on its front end. The lower portions of the claws are made very broad from their front to their back edge, or from their inner to their outer edge, and as they rise on a circle they decrease in width, so as to form sharp points. The design of this construction is to give the binder-man a chance to readily pass binding-straws around the gavel or bundle inside of the axis and the sustaining-rods of the claws, as illustrated in Fig. 6.

I have shown a change in the form of the platform, as at $v$, and of the rake-adjusters $r$, as at $r'$, and of the spring $q$, as at $q'$, so as to adapt the two former to the claws; but this will not affect my case, as my claim does not rest on the platform, nor on the particular form or arrangement of the adjusters and springs.

In order to work the moving claws from the drive-wheel of the harvester through intermediate gearing, I have attached a belt or band, $w$, to the circumference of the disk $t$, and by means of the same connected the pulley to a connecting-rod, $x$, and crank $y$ of the rake-shaft K, as represented. With this arrangement, as the rake-shaft revolves the crank-arm $y$ and pulley $r$ will cause the claws S to close upon the claws R, and thereby compress the grain which has just previously been deposited by the rake upon the claws. As the claws go together the spring $u$ is brought to a tension, and therefore as soon as the draft on the pulley $t$ ceases the spring throws the moving jaws open, ready for a new supply.

Before this occurs, however, the binder takes the proper quantity of straws and runs them with his hand around the bundle, room for his hand being afforded, and brings them up and ties them securely and discharges the gavel upon the ground.

What I claim as my invention, and desire to secure by Letters Patent, is—

1. The jointed sliding rake-arm, applied and operating substantially as and for the purpose described.

2. Widening the claws of the binding device between their axis and their inner curved edge, substantially as and for the purpose described.

3. The arrangement of means specified for opening and closing the claws automatically, as set forth.

JNO. M. GROH.

Witnesses:
DE WITT C. LAWRENCE,
EDWIN S. JACOB.